(12) United States Patent
Goris et al.

(10) Patent No.: US 11,596,888 B2
(45) Date of Patent: Mar. 7, 2023

(54) COALESCENCE FILTER

(71) Applicant: ATLAS COPCO AIRPOWER, NAAMLOZE VENNOOTSCHAP, Antwerpen-Wilrijk (BE)

(72) Inventors: Ken Goris, Antwerpen-Wilrijk (BE); Jo Wouters, Antwerpen-Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 251 days.

(21) Appl. No.: 16/620,633

(22) PCT Filed: Jun. 12, 2018

(86) PCT No.: PCT/IB2018/054225
§ 371 (c)(1),
(2) Date: Dec. 9, 2019

(87) PCT Pub. No.: WO2018/229639
PCT Pub. Date: Dec. 20, 2018

(65) Prior Publication Data
US 2020/0188829 A1    Jun. 18, 2020

(30) Foreign Application Priority Data

Jun. 12, 2017   (BE) .................................. 2017/5420

(51) Int. Cl.
*B01D 46/00* (2022.01)
*B01D 46/24* (2006.01)

(52) U.S. Cl.
CPC ..... *B01D 46/0031* (2013.01); *B01D 46/2407* (2013.01); *B01D 46/2414* (2013.01); *B01D 2275/10* (2013.01)

(58) Field of Classification Search
CPC ............ B01D 46/0031; B01D 46/2407; B01D 46/2414; B01D 2275/10; B01D 46/00;
(Continued)

(56) References Cited

U.S. PATENT DOCUMENTS

2005/0115216 A1\* 6/2005 Bauer ................... B01D 46/00
2009/0211544 A1\* 8/2009 Frazier, Jr. ......... B01D 46/0005
123/41.86
(Continued)

FOREIGN PATENT DOCUMENTS

CN       104667628 A  \*  6/2015   ......... B01D 17/0202
GB         2261830 A  \*  6/1993   ......... B01D 46/0031
(Continued)

OTHER PUBLICATIONS

International Search Report and Written Opinion in corresponding PCT Application No. PCT/IB2018/054225, dated Oct. 11, 2018.
(Continued)

*Primary Examiner* — Robert A Hopkins
*Assistant Examiner* — Qianping He
(74) *Attorney, Agent, or Firm* — Bacon & Thomas, PLLC

(57) ABSTRACT

A set including a filter candle for separating a compressed gas and a disperse phase present therein, and a bottom cap placed on a lower side of the filter candle. The filter candle contains a filter medium containing a coalescence medium for coalescing the disperse phase and a drainage medium for draining the coalesced disperse phase in a downward direction to the bottom cap, where at least one drainage opening is provided in the bottom cap at a position corresponding to the drainage medium for discharging coalesced liquid from the drainage medium. A side of the bottom cap facing away from the filter medium is provided with a drip-off position and with at least one drainage profile which extends from the at least one drainage opening, where the drainage profile is
(Continued)

provided for discharging the coalesced disperse phase from the at least one draining opening to the drip-off position.

20 Claims, 8 Drawing Sheets

(58) Field of Classification Search
CPC ... B01D 46/24; B01D 36/003; B01D 201/291
USPC .......................................................... 55/423
See application file for complete search history.

(56) References Cited

U.S. PATENT DOCUMENTS

2017/0144128 A1   5/2017  Carrion et al.
2018/0117517 A1*  5/2018  Tanaka ................. B01D 46/521

FOREIGN PATENT DOCUMENTS

| GB | 2457598 A | 8/2009 |
| WO | 9310881 A1 | 6/1993 |
| WO | 2016181820 A1 | 11/2016 |

OTHER PUBLICATIONS

Written Opinion of the International Preliminary Examining Authority in corresponding PCT Application No. PCT/IB2018/054225, dated May 20, 2019.

International Preliminary Report on Patentability in corresponding PCT Application No. PCT/IB2018/054225, dated Sep. 13, 2019.

* cited by examiner

COALESCENCE FILTER

This invention pertains to a set, comprising a filter candle for separating a compressed gas and a disperse phase contained therein, and a bottom cap placed on a lower side of the filter candle, where the filter candle contains a filter medium, which, looking in the flow direction of the gas, contains a coalescence medium for coalescing the disperse phase and a drainage medium for draining the coalesced disperse phase in downward direction to the bottom cap for discharging the coalesced disperse phase, in which at least one drainage opening is provided in the bottom cap at a position corresponding to the drainage medium for the coalesced liquid originating from the drainage medium, in accordance with the preamble to the first claim.

BACKGROUND OF THE INVENTION

The use of coalescence filters for coalescing a disperse phase from a mixture of two immiscible phases, a continuous and a disperse phase, is well-known. Examples of practical applications include separating oil aerosol drops from compressed air from air compressors and crankshafts, separating water as a disperse phase of fuel as a continuous phase in fuel-water systems, or separating oil as a disperse phase from a water-oil system with water as continuous phase.

Coalescence of the disperse phase is induced by a coalescence medium, which usually comprises a multitude of layers of one or more porous, fibrous substrates, which may be wetting (oleophilic or hydrophilic or compatible with the disperse phase or adsorbent) or non-wetting (oleophobic or hydrophobic or repellent to the disperse phase). The fibrous substrate of the coalescence medium and the pore system present therein have a surface that induces aggregation or coalescence of the disperse phase. When using the coalescence filter, a dispersed fluid containing drops of a disperse phase is moved together with the continuous phase or carrier of the fluid through the coalescence medium. A practical example is purifying oil contaminated air by sending the air through a coalescence filter. The disperse phase often coalesces in the first layers on the fibres of the coalescence medium. With continuous supply of dispersed fluid, the smaller drops grow into larger drops. The drops are transported throughout the filter with the air flow, and as soon as they reach a size such that the droplets no longer stick to the fibres of the coalescence medium, they leave the filter via the drainage medium, normally under the influence of gravitation.

Coalescing filters can be embodied in various types of materials, for example organic and inorganic fibrous or porous materials. These materials are available in various forms, for example as homogeneous, heterogeneous, layered or folded or pleated or rolled materials, sintered materials, laminates and combinations thereof.

Forms suitable for use as coalescence filter are typically a membrane, cloth, cylinder, prismatic or other simple or complex geometric shape. The separation capacity of a filter material depends on various parameters including the composition and orientation of the fibres in the filter or coalescence medium, the yield of the filter material under the practical conditions, the concentration of the disperse phase (contaminants) in the carrier or continuous phase, the pressure to which the filter material is subjected and the volume of continuous phase to which the filter is exposed in the course of time.

In vertically positioned coalescing filters, the filter medium, i.e. the coalescence medium and the drainage medium, is usually held between an upper end cap and a lower shell or end cap for collecting the oil draining from the drainage medium. The lower and/or upper end caps are often attached to the coalescence medium and/or drainage medium by adhesive bonding.

After a while, a coalescence filter usually reaches a stationary state, where the accumulation rate of the disperse phase drops in the coalescence medium corresponds to the draining rate of coalesced disperse phase from the filter. Coalesced drops typically have a droplet diameter of 5 to 1000 μm. However, with such filters, the problem arises that discharge or drainage of coalesced oil from the drainage medium is too slow and that a lower part of the drainage medium becomes saturated with oil. The air coming from the coalescence medium flows forcedly through the drainage medium, a lower part of which is saturated with oil in the vicinity of the bottom cap. This not only leads to a re-uptake of oil through the purified air flowing through part of the drainage medium but can also lead to the bursting of oil droplets on the outer surface of the drainage medium, which form oil particles on the outgoing, clean side of the filter and which are then carried along by the purified air.

WO93/10881 describes a cylindrical filter for purifying an air stream contaminated with an oil mist of oil aerosol. WO93/10881 describes that it is possible to largely reduce an overlap between the coalescent layer and an oil-saturated band or so-called "wet zone" at the bottom of the drainage medium, if a lower part of the drainage medium is not disturbed and is in a quiet area that is axially lower than the coalescence layer. Disturbance of the drainage medium can be caused, among other things, by pressure changes, but also by local compression of the drainage medium, and the design of the drainage medium, for example, indentation or grooving of the lower edge of the drainage system. For example, compression of the lower part of the drainage medium may occur when the material is being mounted in the filter head, or by clogging the lower part of the drainage medium so that oil is drained along the sides and not along the bottom end of the drainage medium. The obstruction of the lower end of the drainage medium can also lead to an increase in the wet zone, because oil can only flow away via the side and not through the bottom of the drainage layer.

The filter described in WO93/10881 comprises a layer of a microporous coalescence material for coalescing the oil mist present in the air, a layer of a macroporous drainage material for absorbing the coalesced liquid from the coalescence material and discharging it to a lower part of the filter, from where the coalesced liquid drains in the form of drops. The filter is closed at the bottom by an end cap in which the coalescence medium is glued. The end cap connects gas-tight to the filter layer and closes the lower part of the filter. To reduce oil transfer from the filter to the air flowing through the filter, the drainage layer has a lower part that is placed at a distance from the coalescence medium, and separated from the coalescence medium by a raised edge of another, non-permeable material.

However, the filter described in WO93/10881 has the disadvantage that the drainage layer is compressed near the end cap. This prevents efficient drainage, and capillary action creates a so-called wet-band that can become a few mm to a few cm high. The compression of the drainage layer contributes to the formation of an oil-saturated strip at the bottom of the drainage layer. As a result, there is a risk that oil present in this zone will be re-entrained by the purified air flow leaving the filter via the drainage layer.

WO2016/181820 describes an end cap of which the side facing the filter material comprises a central protrusion extending to and in the interior space of the filter candle, and which serves to demarcate a central space around which the filter material is arranged. In addition, the end cap contains an outer peripheral wall, with an outer and an inner ring which are connected to each other by means of a multitude of radially-routed extending connections. Drainage openings are provided between the connections. The end cap described in WO2016/181820 does not contain a drip-off position and no means for removing oil from the drainage openings to the drip-off position, because of which oil drainage from the drainage medium is insufficient and too slow.

US2017/144128 describes a pre-filter for a fuel tank comprising a first end cap with a central opening. Along the circumference of the end cap a liquid flow channel is provided, of which part of the bottom is step-shaped, and a part is ring-shaped. The coalesced fluid can flow through the end cap, through a gap between the step-shaped channel part and the ring-shaped channel part. However, US2017/144128 does not describe how to provide a drip-off position and means for discharging oil from drainage openings to the drip-off position such that oil drainage from the drainage medium is insufficient and too slow.

SUMMARY OF THE INVENTION

This invention therefore envisages providing a filter that exhibits a further reduced risk of formation of a disperse-phase saturated zone in the drainage medium, for example an oil-saturated zone.

According to the invention, this is achieved with a filter displaying the features of the characteristic of the first claim.

To this end, this invention pertains to a set comprising a filter candle for separating a compressed gas and a disperse phase present therein, and a bottom cap placed on a lower side of the filter candle, where the filter candle contains a filter medium that, in the gas flow direction, contains a coalescence medium for coalescing the disperse phase and a drainage medium for draining coalesced disperse phase in downward direction to the bottom cap for the drainage of the coalesced disperse phase, where at least one drainage opening is provided in the bottom cap at a position corresponding to the drainage medium for discharging coalesced liquid from the drainage medium. The set according to the invention is characterized in that a side of the bottom cap directed away from the filter medium is provided with a drip-off position which is situated at a position which is shifted relative to the at least one drainage opening to a central part of the bottom cap and with at least one drainage profile extending from the at least one drainage opening to the drip-off position, where the drainage profile is provided for discharging the coalesced disperse phase from the at least one drainage opening to the drip-off position along which the coalesced disperse phase is drained.

According to the invention, a drainage profile includes any profile, irrespective of its shape, which is located on the side of the bottom cap which faces away from the filter medium, and which is recessed or extends in respect of this side or a combination of both. According to this invention, drainage profile further refers to any profile extending from at least one drainage opening in the direction of the drip-off position.

The inventors have found that the presence of at least one drainage profile that is connected to the at least one drainage opening and that extends from the at least one drainage opening, promotes discharge of the coalesced disperse phase from the at least one drainage opening to the drip-off position, for example, discharge of coalesced liquid. In addition, the drainage profile ensures that the discharge of the coalesced disperse phase is directed in a desired direction along the side of the bottom cap directed away from the filter medium, in particular from the drainage opening in the direction of the drip-off position. The more directed, possibly improved and possibly accelerated discharge of the coalesced disperse phase from the drainage opening has a stimulating effect on its drainage through the drainage layer, and, in other words, allows for a better flow of the coalesced disperse phase through the drainage medium and consequently facilitates improved drainage. Because of the improved drainage, the formation of the so-called "wet band", this is an accumulation of coalesced disperse phase, for example liquid, in a band at the bottom of the drainage medium as shown in FIG. 2, is counteracted. This wet belt often extends axially to a height where purified gas from the coalescence medium flows through the drainage layer. As the formation of the wet band is counteracted, it becomes possible to minimize the risk of the re-absorption of coalesced disperse phase by the purified gas flowing through the filter, The presence of the at least one drainage profile further offers the advantage that the direction in which the coalesced disperse phase leaves the filter is controlled, so that a more directed discharge of the coalesced disperse phase and a more efficient accumulation at the drip-off position becomes possible. The directed discharge furthermore offers the advantage of reduced contamination of the bottom cap along the side of the liquid discharge, as well as of the surrounding parts and an improved, often accelerated discharge of the coalesced disperse phase.

In a first preferred embodiment of the invention, the at least one drainage profile protrudes from the side of the bottom cap that faces away from the filter medium or is sunk into it. In the latter case, the drainage profile will usually take the form of a drainage groove. In the former case, the drainage profile can, for example, take the form of a ridge on the side of the bottom cap that faces away from the filter medium.

In another preferred embodiment, one or more drainage openings are provided along a peripheral edge of the bottom cap. More preferably, at least one drainage opening extends in circumferential direction of the bottom cap along at least a part of the circumference, to facilitate efficient discharge from the drainage medium and several such drainage openings are present.

The at least one drainage profile can take various shapes and/or dimensions considered suitable by an expert and it can extend in various directions. In a preferred embodiment, the at least one drainage profile extends from the drainage opening to, or in other words, in the direction of the drip-off position, to the drip-off position or over only a part of the distance between the drip-off position and the drainage opening. In a preferred embodiment, the at least one drainage profile extends from a terminal position of the drainage opening or from a position shifted to the centre of the drainage opening, in the direction of the drip-off position, or a combination of both. This is especially relevant when a bottom cap with openings or gaps which extend along a larger part of the circumference of the bottom is used, to allow efficient discharge of coalesced liquid along the entire length of the opening. In another preferred embodiment of the invention, the at least one drainage profile is applied in an upright edge extending in downward direction from a side of the bottom cap facing away from the filter candle, at a side of the upright edge facing the at least one drainage opening.

To allow for a desired positioning of the drainage medium in respect of the at least one drainage opening in the bottom cap, and to effect the most efficient drainage possible, a side of the bottom cap facing the drainage medium preferably comprises fastening means for positioning at least a part of a lower edge of the drainage medium on the side of the bottom cap facing the drainage medium. These fastening means can, for example, be mechanical fastening means, provided on a side of the bottom cap facing the drainage medium, such as, for example, hooks or other projections attached to the bottom cap to which the drainage medium can be hooked, for example, or can be mechanically fixed in another manner, one or more discrete, separately spaced tabs that extend from the bottom cap to the drainage medium for holding discrete parts of the drainage medium between the tab and the peripheral edge of the bottom cap, an upright double edge extending from the bottom cap in the direction of the drainage medium between which the drainage medium is kept, where the double edge is preferably such that the drainage medium is not sandwiched by the double edge. It will be clear that any other mechanical fastening deemed suitable by an expert can be used.

In a further preferred embodiment, a lower edge of the drainage medium is attached to the side of the bottom cap facing the drainage medium, for instance by welding, for example ultrasonic welding, fusing, using an adhesive or glue. In the context of this invention, an adhesive refers to a non-mechanical adhesive. A wide range of adhesives can be used in the invention, for example, a glue or a resin or the like, bonding can be realised by soldering or fusing the material of the drainage medium and the bottom cap. The expert can identify the appropriate adhesive, with due consideration to the material in which the drainage medium and the bottom cap, respectively, are embodied. When using an adhesive, the connection between the drainage medium and the bottom cap is preferably established via spaced connecting points on a lower edge of the drainage medium or connection via a lower part of the upright side of the drainage medium so that a lower part edge of the drainage medium remains essentially open and drainage of coalesced liquid to the opening remains possible.

BRIEF DESCRIPTION OF THE DRAWINGS

The invention is further explained by using the accompanying figures and description of these figures.

DETAILED DESCRIPTION OF THE INVENTION

Figure 1:
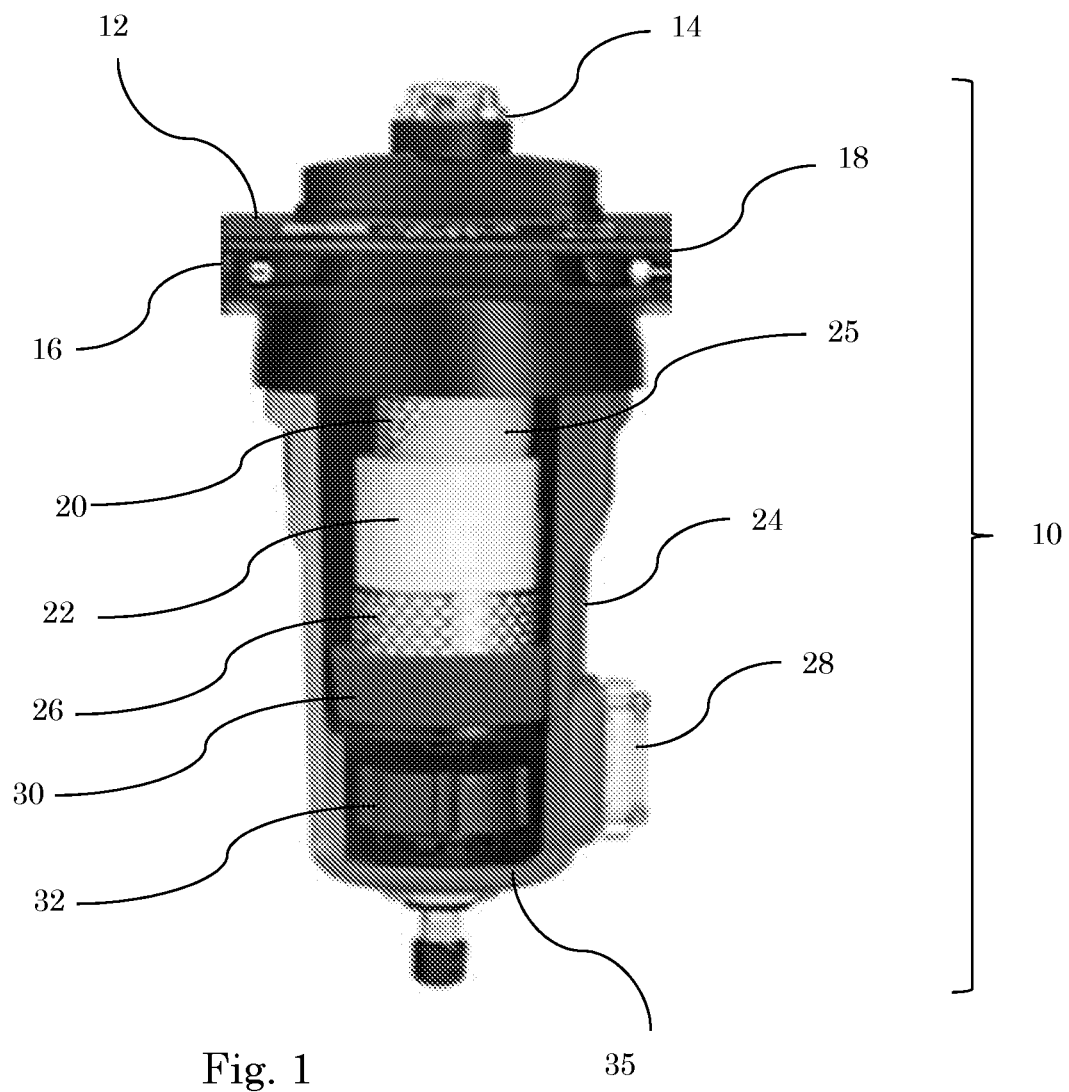
FIG. 1 shows a view of the interior of a coalescence filter as is generally used for coalescing a disperse liquid phase present in a gas phase.

The coalescing filter 10 shown in FIG. 1 comprises a closed housing 24 with a filter head 12 at the top. Filter head 12 has an inlet 16 along which a compressed gas in which a disperse phase is present, for example an aerosol of a liquid, is fed to the coalescence filter. In the description below, a liquid aerosol will always be referred to as an example of a disperse phase in a gas, for example air, as a continuous phase. However, this does not detract from the fact that other compressed gases in which other disperse phases are present are also suitable for use in this invention.

The housing 24 contains an outlet 18 for discharging the purified compressed gas after the gas has flowed through the filter candle. Filter bowl 35 can be detachably attached to filter head 12 and together form housing 24, so that the interior space of the coalescence filter is accessible for replacing the filter candle 36 if necessary. The detachable connection can be established in any manner deemed appropriate by an expert, for example by means of a screw connection, a bayonet connection, clamps, etc. The filter candle 36 is preferably detachable from filter head 12 and the filter bowl 35, so that the filter candle 36 can be periodically replaced or replaced if necessary.

In the context of this invention, filter candle refers to be a unit of a filter material which is kept in the bottom cap, preferably between an upper cap and the bottom cap, and which, in addition, contains at least one coalescent medium and a drainage medium. The filter candle can also further contain one or more barrier layers, to counteract back-flow of coalesced disperse phase to the coalescence medium.

The coalescing filter shown in FIG. 1 is intended for coalescing one or more liquid, disperse phases present in a gaseous carrier of a gas, for example a compressed gas. The one or more disperse phases may be contaminants or, for example, an inert or reactive substance. The one or more disperse phases may belong, for example, to the group of liquids, aerosols, macro-drops or mixtures of two or more of these materials. The disperse phase is often a contaminant to be removed from the gas phase. An example of a fluid suitable for use with the coalescence filter of this invention is a compressed gas, for example compressed gas, contaminated with an oil or water aerosol as a disperse phase.

The filter candle contains a filter medium containing at least one layer of a microporous coalescence medium. Materials suitable for use as coalescence medium are known to the expert and include micro porous materials, preferably porous materials with pores having an average diameter of between 2 and 100 µm. Depending on the intended application, especially if coalescence of several pollutants is envisaged, one can choose to install two or more different coalescence media, each with a desired affinity for the contaminant to be removed. The coalescence medium can be composed of a single layer or of two or more layers, these can consist of the same or different materials. Suitable layered materials include substrates or materials built up of fibres having a finite length, continuous filaments and combinations thereof. The primary coalescence medium preferably contains materials resistant to the pressure exerted to facilitate displacement of the fluid through the primary coalescence medium, against the liquid contaminants present in the fluid and the static and dynamic stress to which the material is exposed when manufacturing, assembling, and using the filter. Examples of suitable layer-shaped fibrous materials include woven or non-woven fibrous materials, knitted fabrics, braid, felts and combinations of materials or laminates or composites thereof.

The filter medium contains at least one layer of a macroporous drainage medium 30, for maximizing the discharge of coalesced liquid from filter media, adjacent to and downstream of the coalescence medium 22. The drainage medium 30 is preferably placed adjacent to a surface of the coalescence medium 22, with or without an air layer or other physical separation between the two media. Preferably, the drainage medium and the coalescence medium are positioned adjacent to a substantial part of their surface, without an air layer between them to allow for an energy-efficient flow of gas and/or coalesced disperse phase from the coalescence medium to the drainage layer. The coalescence medium and the drainage medium may, for example, and preferably be set-up concentrically.

Drainage usually takes place under the influence of gravitation but can also be forced.

The drainage medium may, seen in the circumferential direction of the filter candle, be in contact with the coalescent medium over its entire length. However, the drainage medium will preferably be in contact with the coalescence medium over a total length in circumferential direction of the bottom cap, which varies between 15 and 85% of the circumference of the bottom cap at the level of the drainage medium. The contact between the two media will be substantially interrupted by positioning aids on the bottom cap, near the drainage openings. The contact between the two media will mainly exist at the positions between the drainage openings and will be substantially absent at the level of the drainage openings. The drainage medium may, in terms of the height of the filter candle, be in contact with the coalescent medium over its entire height. The contact between the two media will be principally interrupted by positioning aids on the bottom cap, near the drainage openings.

The expert is familiar with materials suitable for use as drainage medium. Examples of suitable drainage materials are woven or non-woven materials, knitted fabrics, felts, open cell polymer foams, spun webs, open nets and combinations or laminates or composites of the aforementioned materials. Materials for use in the drainage medium may be selected, for example, from the group of thermoplastic or thermosetting plastics, organic or inorganic substances, metallic materials or alloys, mixtures of materials referred to above and chemically modified forms thereof. Suitable materials for manufacturing the drainage medium include polymer foams, e.g. polyurethane foam, polyethylene foam, polypropylene foam, polyvinyl chloride foam, polystyrene foam, polycarbonate foam, polyimide foam. However, a polyurethane foam is preferably used, because of its good resistance to thermal stress and its ability to act as a barrier layer that counteracts the return of the coalesced liquid to the coalescence medium. Other materials suitable for use as drainage medium include so called spacer materials, these are materials which contain at least a first spacer layer in the flow direction of the compressed gas. Spacer materials preferably further contain at least one barrier layer adjacent to the spacer layer set up downstream. In the context of this invention, "barrier layer" refers to a sheet or layer of a material that has a lower permeability to the coalesced contamination than the distance layer, and which is capable of adsorbing coalesced contamination that would not have been discharged via the spacer layer and discharging it in the draining direction. The barrier layer is particularly intended to minimize the risk that coalesced disperse phase would be entrained with the flowing purified air, and would leave the filter again. According to this invention, "spacer layer" refers to a layer of a material that has a high drainage capacity for the coalesced disperse phase in a drainage direction. The spacer layer preferably has a porous, open structure in the drainage direction, which facilitates efficient drainage or removal of the coalesced contamination from the coalescence filter, in particular from the drainage layer.

The spacer layer may be composed of a sheet of a single material layer, but the spacer layer may also contain two or more identical or different material layers. The spacer layer may be composed of a sheet of a single material layer, but the spacer layer may also contain two or more identical or different material layers.

In another preferred embodiment the spacer layer comprises a three-dimensional spacer textile, a three-dimensional knitted fabric or a combination of two or more of these materials, in which opposite skin layers of the spacing textile or three-dimensional knitted fabric connected by means of spacer fibres, at least a part of which extends in the flow direction of the compressed gas through the coalescence filter to achieve the lowest possible flow resistance.

If desired, the filter medium can also contain a protective layer 25 upstream, but also downstream of the primary coalescence medium 22. This protective layer 25 can also serve as a drainage layer. An example of a suitable material for use as a protective layer is an open woven polypropylene layer, but other woven or non-woven materials can also be used. The filter element preferably also contains a core 20. At least one primary coalescence medium 22 is set up downstream of the filter core 20.

The housing 24 of coalescence filter 10 may further include a drainage mechanism with a float drain 32 that closes the bottom of the filter. A suitable drainage mechanism may contain automatic, semi-automatic or manual valves, along which a coalesced disperse phase retained in the housing is removed.

The set of the present invention includes a bottom cap 33 at the bottom. The set of this invention preferably also includes an upper end cap at the top. This makes it possible to position and keep the filter candle with the filter medium between the upper end cap and the bottom cap.

The bottom cap 33 can be made of various materials known to the expert, for example metal, such as stainless steel, or plastic. Plastic is often preferred because of the simple design possibilities and the large range of possibilities for connecting the plastic to the material of the drainage medium 30 for positioning the drainage medium on the bottom cap 33.

A connection of the drainage medium 30 to the bottom cap 33 ensures that good contact with the bottom cap is ensured along the entire edge of the drainage medium 30, thereby promoting drainage. Various means for connecting the drainage medium 30 to the bottom cap 33 are known to the expert.

Figure 7A:
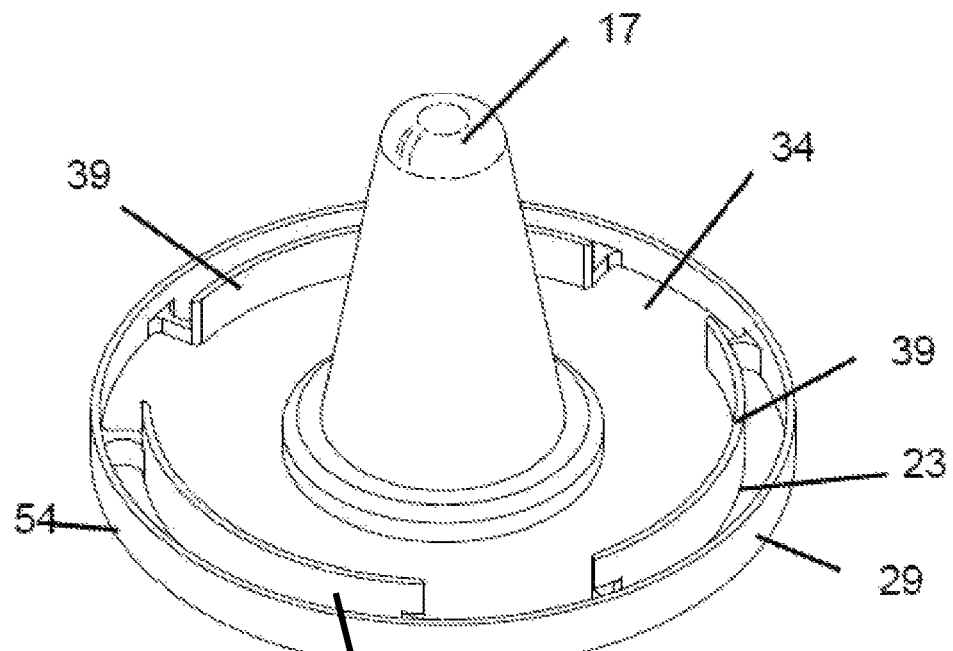
FIGS. 7a and 7b respectively show a plan view and a view of the underside of a bottom cap fitted with positioning aids.
Figure 7B:
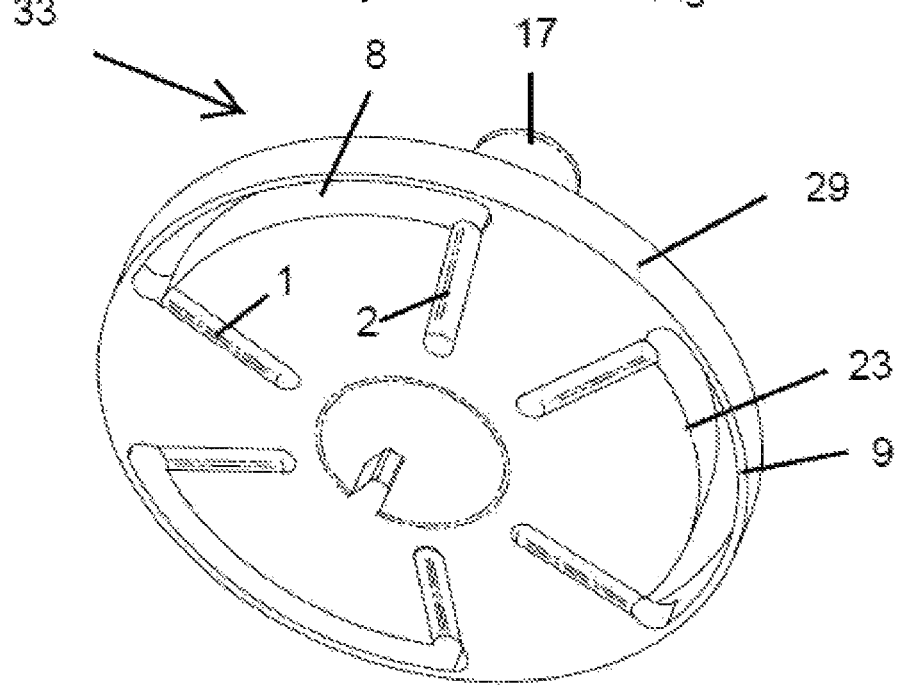

In a first preferred embodiment the connecting means are mechanical connecting means. As shown in FIGS. 7a and 7b, a side 34 of the bottom cap 33 directed towards the drainage medium 30 may be fitted with a multitude of discrete, spaced-apart mechanical connecting means 29, 39 for holding the bottom edge of the drainage medium. As a result, it is no longer necessary to connect the coalescence medium 22 and the drainage medium 30, for instance by sticking them together. This offers the advantage that the risk of disturbing or hindering both the coalescence and drainage by this connection can be reduced to a minimum and that the drainage medium is fully available for draining the coalesced disperse phase, also in a lower part of the drainage medium, i.e. the part near the bottom cap 33 where drainage plays a major role. In the coalescence filters, known to the expert in the field, the drainage medium is often glued or welded to the coalescence medium and/or to the bottom cap. Such a compound has an adverse effect on the drainage capacity and speed and reduces the amount of drainage medium available for drainage. The availability of a larger part of the drainage medium in this invention makes it possible to further reduce the risk of transfer of, for example, coalesced oil which has been deposited or accumulated in the drainage medium, to the air flowing through the filter candle.

Suitable examples of mechanical fastening means or mechanical means for holding the drainage medium on the bottom cap 33 include pins, hooks, tabs or any other form of projections to which the drainage medium can be attached. To facilitate proper attachment, at least 3 hooks or pins or the like are preferably provided. In another embodiment, a lower edge of the drainage medium 30 is attached to the bottom using an adhesive, in particular a glue, resin or the like, by welding or fusing. This connection is also preferably applied as discrete, spaced-apart parts or points, so that the drainage medium remains open at the lower edge and drainage can take place. The adhesive is preferably applied to a surface of the drainage medium that is in contact with the bottom cap, in particular the edge by which the drainage medium rests on the bottom cap.

In a preferred embodiment, a side 34 of the bottom cap 33 facing the drainage medium contains positioning aids for positioning at least a part of a lower edge of the drainage medium 30 on the side 34 of the bottom cap 33 directed towards the drainage medium. These positioning aids can take any form known to the expert and considered suitable by him. The positioning aids may, for example, comprise an upright edge 29, placed along the edge of the bottom cap 33. The upright edge 29 is preferably embodied such, and the at least one drainage opening 5-8 is preferably applied in the bottom cap such that the upright edge 29 extends along a first side 9 of the drainage opening 5-8. This upright edge 29 can be continuous or interrupted but is preferably a continuous edge. The upright edge 29 is provided for cooperating with a corresponding second protrusion, preferably a second upright edge 39 extending along a second side 19 of the drainage opening 5-8, opposite the first side 9 of the drainage opening. The distance between the first and the second upright edge 29, 39 is preferably chosen such that it is sufficiently large to include the drainage medium 30, and to hold the drainage medium 30. The second protrusion 39 can take any form deemed appropriate by the expert and can preferably be a continuous upright edge, or an upright edge which is preferably interrupted at one or more locations, preferably at the level of the position between two adjacent drainage openings 5-8, or may comprise one, two or more protrusions at the drainage openings. Because of the presence of the positioning aids, this invention makes it possible to use a filter medium in which the coalescence medium and the drainage medium are set up adjacent to each other without necessarily being connected by means of an adhesive, so that a larger active filter surface remains available.

As shown in FIG. 3, i.e. the side of the bottom cap facing away from the filter medium, the bottom cap 33 comprises a bottom 44 in which at least one drainage opening 5, 6, 7, 8 is provided at a position corresponding to a lower edge of the drainage medium. Although one drainage opening may suffice, the bottom cap preferably contains a multitude of drainage openings 5, 6, 7, 8. The drainage openings are preferably set up at a distance from each other along the peripheral edge 54 of the bottom cap 33, and extend through the thickness of the material of the bottom cap, so that liquid can flow from the inner volume of the filter and can be drained from the drainage material through the bottom cap. The openings may be extended in the circumferential direction of the bottom cap 33 and extend along a part of the circumference of the bottom cap, as is shown in FIG. 3d. The drainage openings may have a larger or smaller length, seen in the circumference of the bottom cap.

At least one of the openings 5, 6, 7, 8 in the bottom cap is connected to a drainage profile 1, 2, 3, 4, 13, 14, which extends from the at least one drainage opening 5, 6, 7, 8 in the direction of the drip-off position 15 and which is provided for promoting the discharge of the coalesced disperse phase or liquid.

The at least one drainage opening 5, 6, 7, 8 can have any shape considered suitable by the expert, in particular a regular or irregular geometrical shape. The at least one opening can be substantially round or oval, triangular, square, elongated or any other shape considered suitable by the expert as shown in FIG. 3a-3d. The embodiment shown in FIG. 3d in which the drainage opening extends in circumferential direction of the bottom cap along a larger part of the circumference, is preferred because it allows for an efficient liquid discharge. The dimensions of the openings 5, 6, 7, 8 are not critical to this invention and can vary within wide limits, on the condition that the openings do not extend below the coalescence medium. To that end, the dimensions of the openings in the radial direction of the bottom cap are usually kept within predetermined limits. In the transverse direction the dimensions of the drainage profiles are preferably chosen in such a way that they support and promote droplet formation and drip drainage as well as possible. The width of the drainage profiles in the radial direction of the bottom cap 33, preferably corresponds to the thickness of the drainage medium in the radial direction of the filter medium to ensure a most optimal overlap between the bottom edge of the drainage medium supported by the bottom cap and the drainage opening, and to ensure efficient drainage. To ensure a sufficiently large overlap with the lower edge of the drainage medium, the drainage openings usually have a total circumferential length of the bottom cap which varies between 15 and 85% of the circumference of the bottom cap at the level of the drainage openings.

The number of drainage openings can be selected by the expert, with due consideration to their dimensions and the intended drainage speed and efficiency. There are usually at least two drainage openings present. The distance between consecutive openings in the circumferential direction of the underside 34 of the bottom cap is not critical to this invention and can vary within wide limits, but will usually be chosen so that an optimal discharge of coalesced liquid is possible.

Figures 4A, 4B:
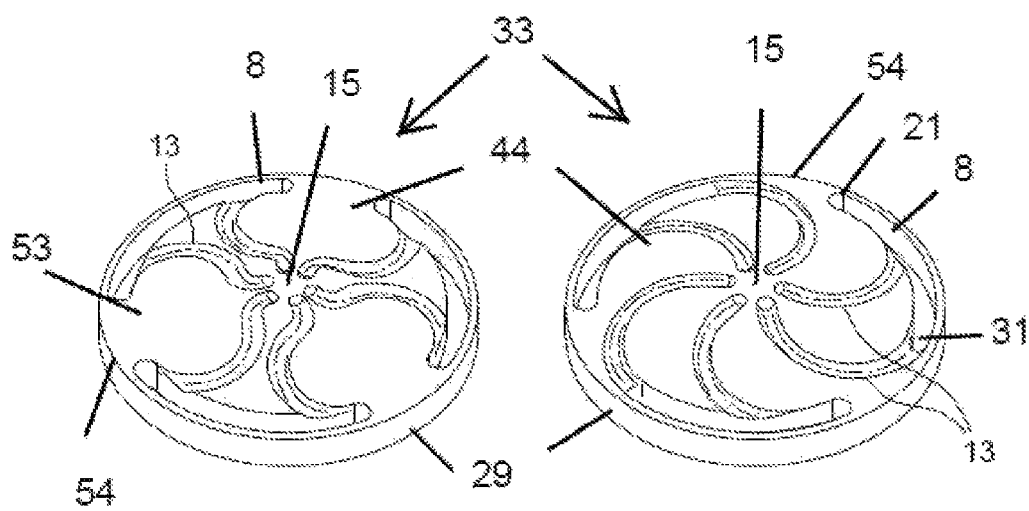
FIGS. 4a-4d show a view of the side of the bottom cap facing away from the filter medium with drainage openings and drainage grooves applied along the circumference of the bottom cap extending from the drainage openings in the direction of a drip-off position.
Figures 4C, 4D:
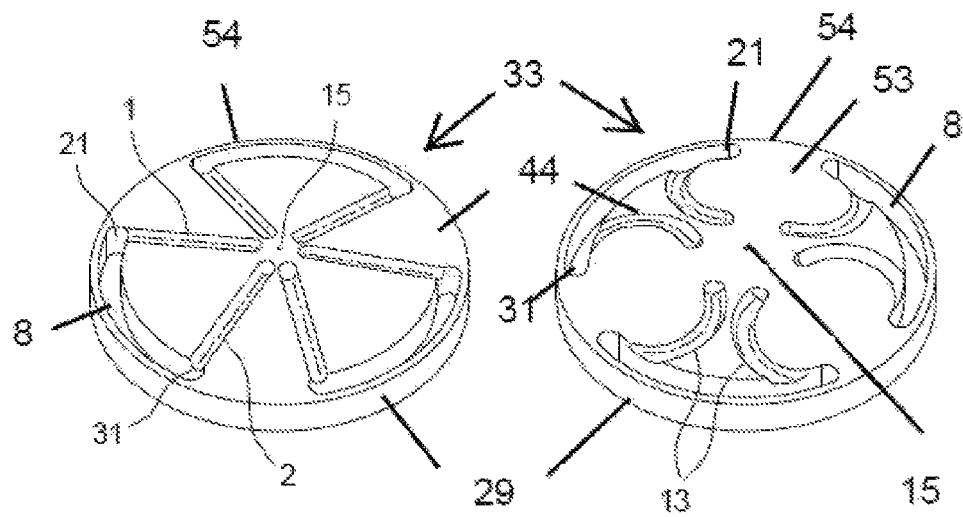

As shown in FIGS. 4c and 4d, a first and a second end 21, 31 of the at least one drainage opening is respectively connected to a first 1 and a second 2 drainage profile. A drainage profile 13 does not necessarily give access only to the ends of at least one drainage opening, but can also extend from a position shifted to the centre of the at least one drainage opening as shown in FIG. 4a.

In a first embodiment shown in FIGS. 4a-4d, the drainage profile 1, 2, 13 is applied in the bottom cap 33 in particular, in a side 34 of the bottom cap 53 which is directed away from the drainage medium. The at least one drainage profile is profiled in respect of the side of the bottom cap which faces away from the filter medium, which means that the drainage profile in the bottom cap can be countersunk and, for example, take on the form of a groove. A drainage profile also refers to the fact that the drainage profile can protrude in respect of the bottom cap, and, for example, can take on the form of a rib or a ridge. However, a combination of a partially countersunk and a partly protruding drainage profile is also possible.

The drainage profile 1, 2, 13 preferably extends from the at least one drainage opening 5-8 in the direction of a drip-off position 15, along which drained coalesced liquid or disperse phase is discharged. The drip-off position 15 is preferably located near the centre of the bottom cap, on a side directed away from the drainage medium. However, it is also possible to provide the drip-off position at a different position.

For example, the drainage profile may extend substantially along a straight line and may extend, for example, principally radially from the drainage opening to the drip-off position as shown in FIG. 4c, however, the drainage profile may also be principally curved (1, 2) and extend from the at least one opening to a drip-off position in the centre of the bottom cap. Successive drainage profiles may be set up concentrically as shown in FIG. 4b, facing away from each other as shown in FIG. 4d and FIG. 4a. However, the expert will preferably choose to set up at least one drainage channel in such a way that the shortest possible distance must be bridged between the opening in the bottom and the drain.

Figure 5A:
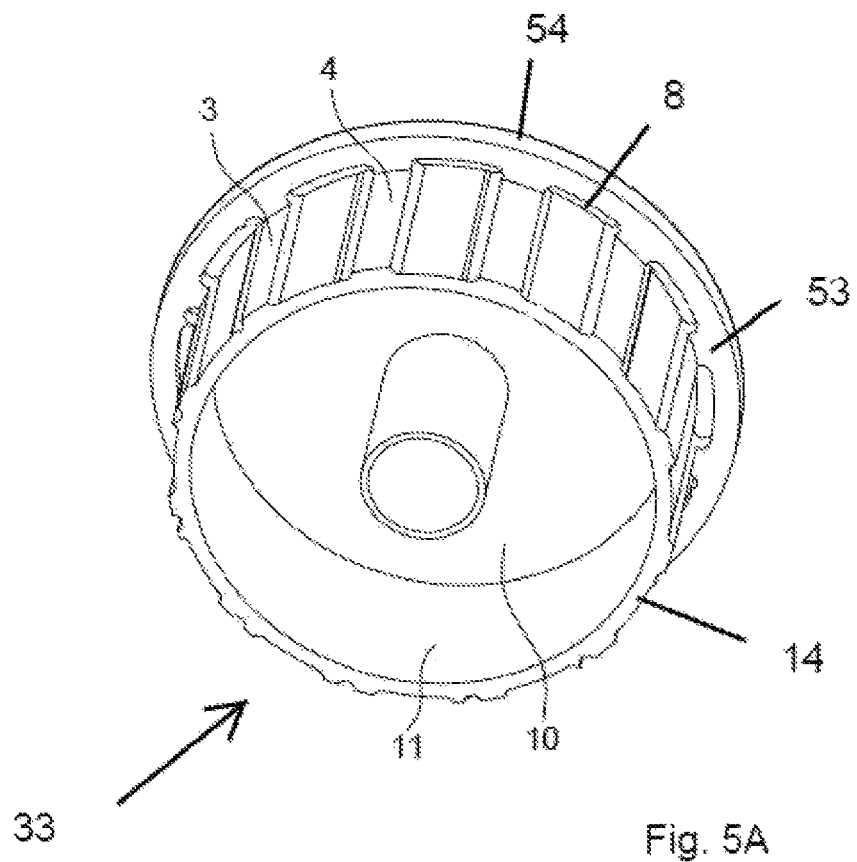
FIG. 5 shows a view of the side of the bottom cap facing away from the filter medium fitted with an upright drainage edge with the drainage grooves.
Figure 5B:
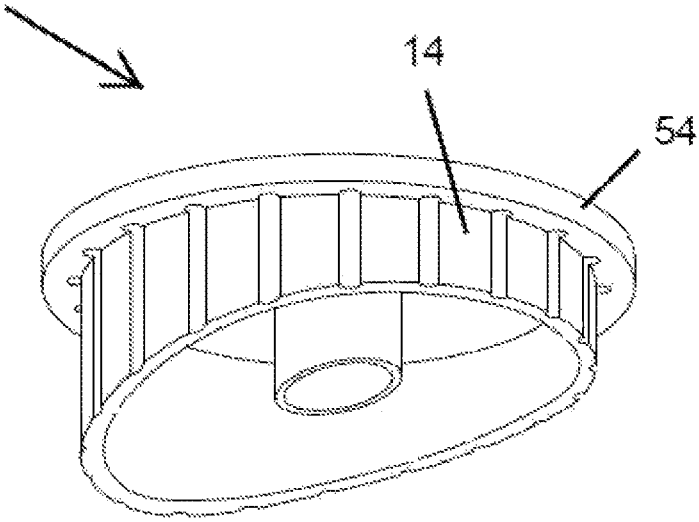

In a second embodiment of the bottom cap shown in FIGS. 5a and 5b, the at least one drainage profile 3, 4 is applied in a drainage edge 14, located on a side 53 of the bottom cap facing away from the drainage medium. The drainage edge 14 can protrude in respect of the side 53 of the bottom cap. The drainage edge 14 can extend principally axially in respect of the filter candle as shown in FIGS. 5a and 5b, but it is also possible that the drainage edge 14 runs conically, i.e. converges to a central position of the filter candle and/or bottom cap. This last example is not shown. When a drainage edge is used, at least one drainage profile 3, 4 is provided on the side of the drainage edge 14 facing the drainage openings 8 for discharging coalesced disperse phase originating from the drainage medium. These drainage profiles 3, 4 extend over the drainage edge and preferably also extend axially with respect to the axis of the filter candle. However, it is also possible to have these drainage profiles 8 run in a different direction, for instance at an angle with respect to the axial direction. However, the expert will preferably choose to set up at least one drainage profile in such a way that a shortest possible distance has to be bridged between the drainage opening and the drain.

The at least one drainage profile 1, 2, 3, 4 can protrude or be recessed in respect of the side of the bottom cap, which faces away from the filter medium. The at least one drainage profile 1, 2, 3, 4 can take the form of, for example, a drainage rib which protrudes in respect of the bottom cap. The at least one drainage profile 1, 2, 3, 4 can take the form of, for example, a drainage groove recessed in respect of the bottom cap. The at least one drainage profile can be continuous or interrupted, but is preferably continuous to ensure efficient discharge to the drip-off position 15.

The dimensions of the drainage profiles 1, 2, 3, 4 in circumferential direction of the bottom cover are not critical to this invention. In a radial direction, the drainage profiles will usually extend from the drainage opening to the drip-off position, but the drainage profiles can also be shorter and extend over only a part of this distance.

The drainage profiles 1, 2, 3, 4 may be provided with a coating over a part or all their length to reduce the friction coefficient and to promote the discharge of the coalesced liquid. The coating can, for example, impart hydrophobic or oleophobic properties. A side of the bottom directed towards the filter candle may also be provided with an oleophobic or hydrophobic coating for promoting the discharge of coalesced liquid in the direction of the drainage openings present in the bottom.

The surface of the at least one drainage profile 1, 2, 3, 4 and the side of the bottom cap on which the at least one drainage profile is located can be smooth or textured. Hereby, the surface of the at least one drainage profile and the side of the bottom cap on which the at least one drainage profile is located can have the same or a different surface texture. For example, the surface may be corrugated or grooved, or have pointed protrusions. The surface texture can take a certain geometric pattern or be random.

The bottom cap 33 has a shape which is aligned to the geometric set-up of the filter candle, usually the bottom will principally be circular, although any other shape is possible. The bottom cap 33 can principally be flat, however, to promote discharge of coalesced liquid along the drainage profiles, the bottom preferably extends conically in the direction of the middle or centre or central part of the bottom cap 33, where the drip-off position 15 is located and along which the coalesced oil is discharged from the bottom cap. This is, for example, shown in FIG. 4a-4d.

In the description given above, the drainage openings are located near the peripheral edge of the bottom cap, and the coalesced disperse phase is fed from the edge of the bottom cap to a drip-off position in the centre of the bottom cap. However, it is also possible to provide the drainage openings at a position which is shifted in the direction of the centre of the bottom cap, and to provide drainage profiles which allow for drainage in the direction of the edge of the bottom cap to one or more drip-off positions on a position shifted more to the edge of the bottom cap.

Figure 8A:
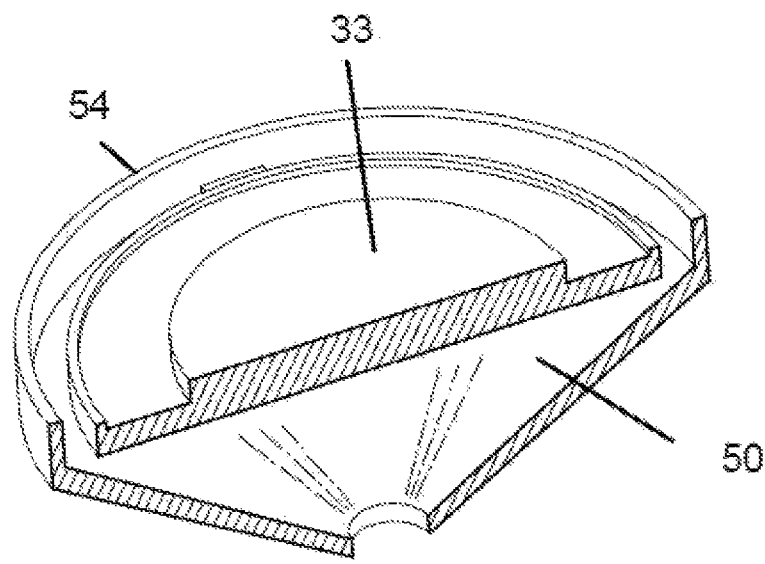
FIGS. 8a and 8b show a view of a bottom cap provided with a collection area for collecting coalesced disperse phase or liquid.
Figure 8B:
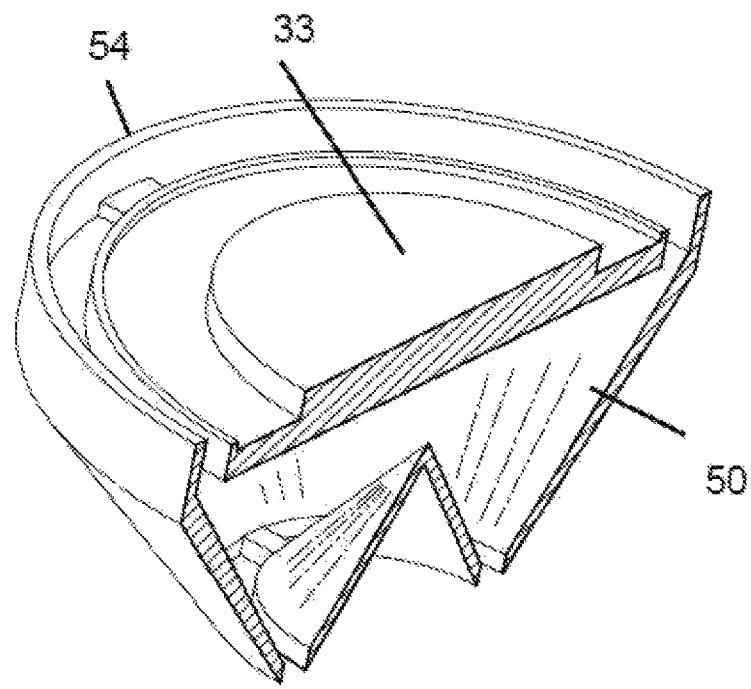

The bottom cap 33 can, as shown in FIG. 8, be provided with a receptacle or bowl 50, if desired, for collecting drained coalesced liquid and discharging it to a drainage circuit. This facilitates even better separation of the disperse phase from the already purified gas.

Figure 2:
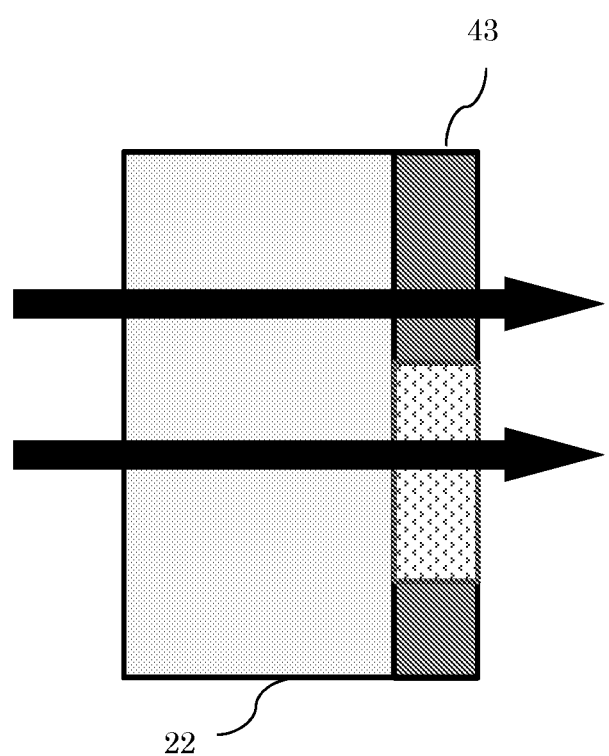
FIG. 2 shows a filter medium with a coalescent medium and a drainage medium, with an oil saturated zone at the bottom.
Figure 3A:
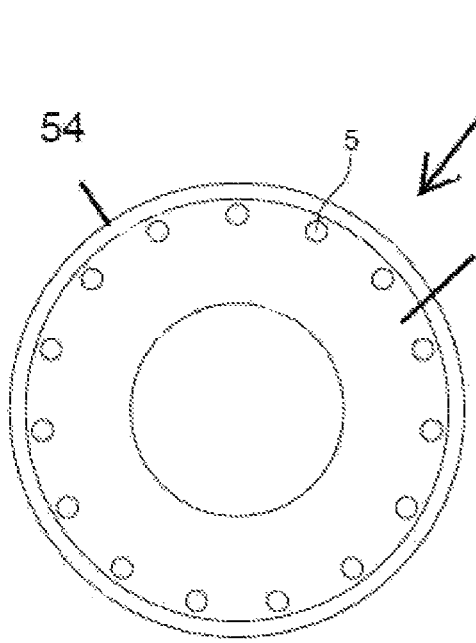
FIG. 3a-3d shows a view of the side of the bottom cap facing the filter medium, with the drainage openings applied along the circumference.
Figure 3B:
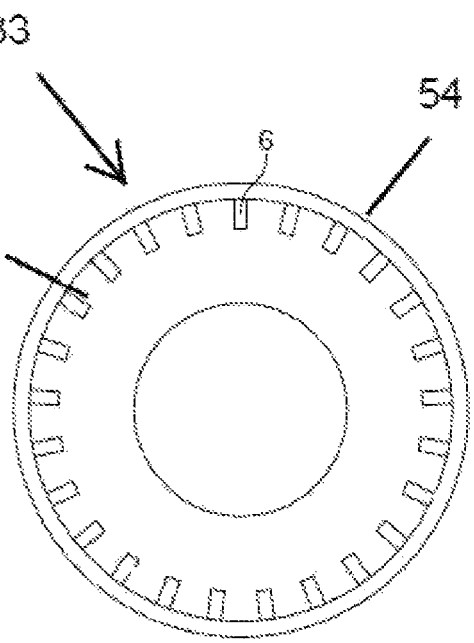
Figure 3C:
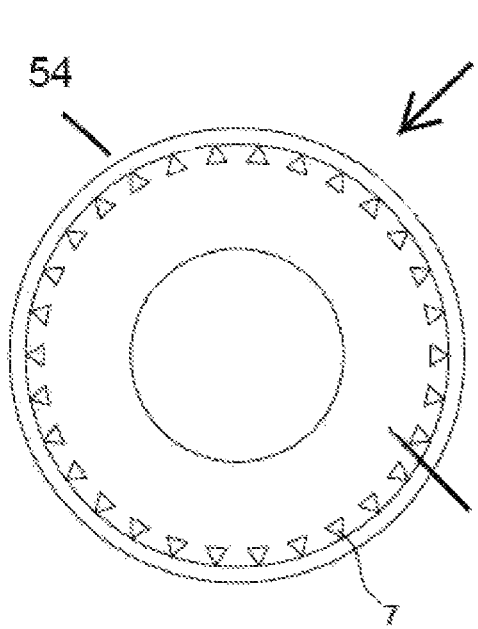
Figure 3D:
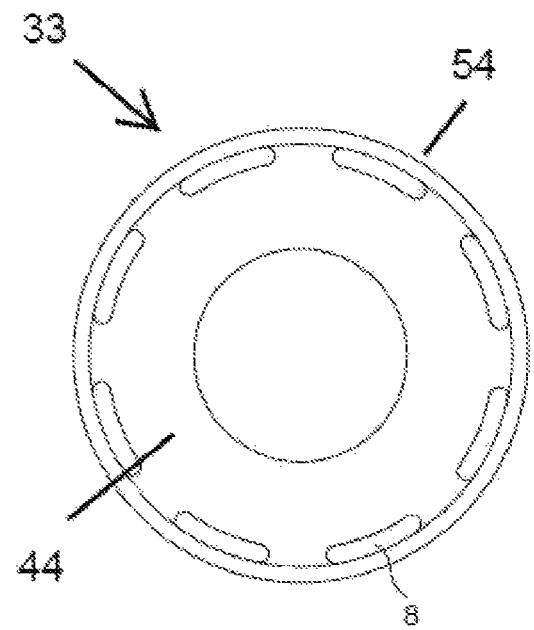

The set of this invention offers the advantage that oil drainage is promoted in such a way that absorption by the drainage medium can be limited to a minimum. Because of the improved drainage, the formation of the so-called "wet band" (this is an accumulation of disperse phase or liquid coalesced in the coalescence medium 22), is counteracted in a band 42 at the bottom of the drainage medium 43 as shown in FIG. 2. This wet belt often extends axially to a height where purified gas from the coalescence medium flows through the drainage layer.

FIG. 7 shows a further preferred embodiment of the filter of this invention, wherein positioning aids 17, 29 are positioned on a side of the bottom facing the drainage medium for positioning the coalescence medium and the drainage medium. The positioning means preferably comprise a protuberance 17 set up in the centre of the bottom and facing the filter candle. The protuberance 17 preferably has the shape of a cone and is provided for positioning the coalescence medium around the cone. Such a cone is suitable, for example, for use with a cylinder-shaped coalescence and drainage medium, with the cone being accommodated in the interior space. The positioning aids further comprise a first edge 39 that extends in circumferential direction of the bottom cap 33 along at least a part of the drainage openings, on a side 23 of the drainage openings 8 facing away from the peripheral edge 29 of the bottom cap. This first edge 39 accordingly limits the thickness of the coalescence medium, and facilitates the arrangement of the coalescence medium between the cone 17 and the first edge 39. The first edge 39 will normally be an interrupted edge formed in parts, the individual parts of which are set up at a distance from each other, and extend along at least a part of the drainage openings 8 in the circumferential direction of the bottom cap 33. Preferably, each edge part extends along the entire length of the corresponding opening 8.

The positioning aids further preferably also comprise an upright peripheral edge 29 that extends in circumferential direction of the bottom cap 33 for positioning the drainage medium between the peripheral edge 29 and the first edge 39. These positioning aids ensure that a lower edge of the drainage medium is placed above the drainage openings 5-8, and that the coalescence medium is located above an unperforated part of the bottom cap 33, between the cone 17 and edge 39. Because of the presence of the first edge between the coalescence medium and the drainage medium, it becomes possible to prevent contact between the coalescence medium and the drainage medium in a lower part of the filter medium where there is a risk of accumulation of coalesced disperse phase or oil in the drainage medium.

This invention pertains to a set comprising a filter candle for separating a compressed gas and a disperse phase present therein, and a bottom cap provided with a bottom cap provided on a lower side of the filter candle, as described above.

This invention further pertains to a bottom cap as part of the filter as described above, or as part of the set as described above.

Figure 6A:
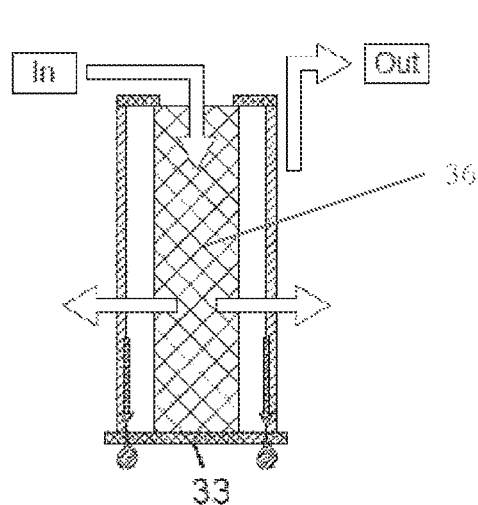
FIG. 6 shows four possible ways in which a stream of a compressed gas can pass through a coalescence filter.
Figure 6B:
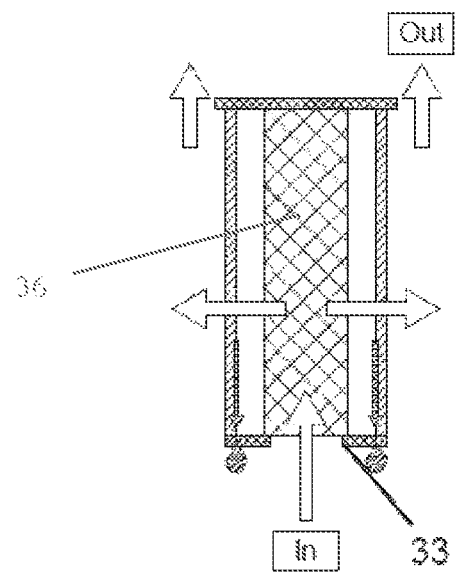
Figure 6C:
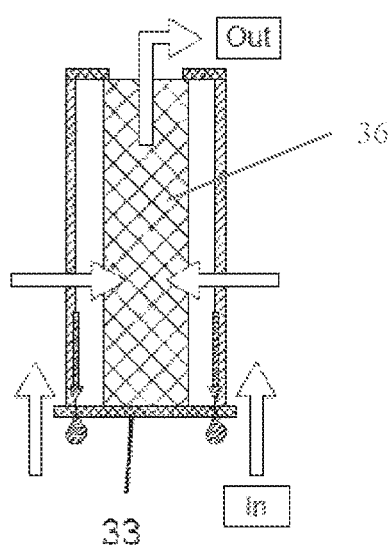
Figure 6D:
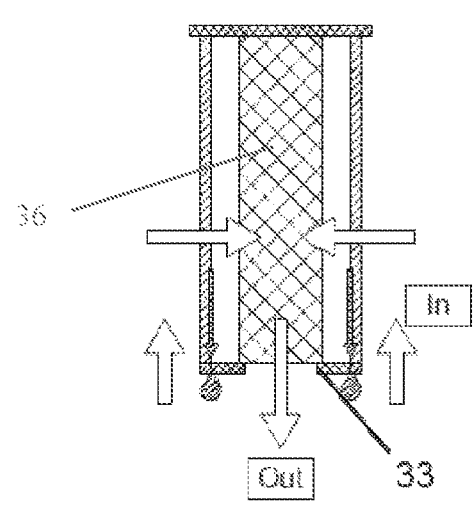

This invention also pertains to a filter comprising a filter candle incorporated in a housing, the housing further comprising a basin located under the bottom cap for collecting coalesced liquid. Such a filter is suitable for use as a separation filter, for example an oil separation filter, in a compressor. Such filters are normally usually subjected to a high mechanical load, because they are placed directly behind a compressor and the air coming from the compressor contains a considerable amount of oil. The air flow in such a filter will usually proceed as shown in FIGS. 6c and d.

The invention claimed is:

1. A set comprising:
   a filter candle for separating a compressed gas and a disperse phase present therein; and
   a bottom cap placed on a lower side of the filter candle, the bottom cap having a bottom side facing away from the filter medium, the bottom side defining a bottom surface,
   wherein the filter candle contains a filter medium, which, looking in the flow direction of the gas, contains a coalescence medium for coalescing the disperse phase and a drainage medium for draining the coalesced disperse phase in a downward direction to the bottom cap for discharging the coalesced disperse phase,
   wherein at least one drainage opening is provided extending through the bottom side of the bottom cap at a position corresponding to the drainage medium for discharging coalesced liquid from the drainage medium,
   wherein the bottom side is provided with a drip-off position that is located at a position shifted relative to the at least one drainage opening to a central part of the bottom cap and at least one drainage profile extending from at least one drainage opening to the drip-off position, the at least one drainage profile being provided for discharging the coalesced disperse phase from the at least one drainage opening to the drip-off position along which the coalesced disperse phase is discharged,
   wherein the at least one drainage profile protrudes from, or is recessed into, the bottom surface of the bottom cap.

2. The set according to claim 1, wherein the at least one drainage profile is a drainage groove.

3. The set according to claim 1, wherein one or more drainage openings are provided along a peripheral edge of the bottom cap.

4. The set according to claim 1, wherein the at least one drainage opening extends circumferentially of the bottom cap along at least a part of the circumference of the bottom cap.

5. The set according to claim 1, wherein the at least one drainage profile extends from a terminal position of the at least one drainage opening or from a position shifted towards the centre of the at least one drainage opening in the direction of the drip-off position.

6. The set according to claim 1, wherein the drip-off position is located in a central part of the bottom cap.

7. The set according to claim 1, wherein the bottom cap is mainly circularly shaped.

8. The set according to claim 1, wherein the at least one drainage profile extends radially from the at least one drainage opening.

9. The set according to claim 1, wherein one or more of the at least one drainage profile is mainly curved.

10. The set according to claim 1, wherein a side of the bottom cap facing the drainage medium comprises positioning aids for positioning at least a part of a lower edge of the drainage medium on the side of the bottom cap facing the drainage medium.

11. The set according to claim 10, wherein a lower edge of the drainage medium is fastened to the side of the bottom cap facing the drainage medium by a fastening selected from the group consisting of welding, fusing, an adhesive or adhesive bonding.

12. The set according to claim 11, wherein the fastening is continuous over the lower edge of the drainage medium or on discrete, spaced-apart parts on the lower edge of the drainage medium.

13. The set according to claim 11, wherein 5-85% of a bottom edge of the drainage medium is fastened to the bottom cap.

14. The set according to claim 1, wherein the at least one drainage profile is coated with an oleophobic or hydrophobic coating to reduce friction.

15. The set according to claim 1, wherein the at least one drainage profile and a side of the bottom cap on which the at least one drainage profile is located, have the same or a different surface texture.

16. The set according to claim 1, wherein the coalescence medium and the drainage medium are arranged concentrically and are positioned adjacently and are in physical contact for at least a part of their circumference.

17. The set according to claim 16, wherein the coalescence medium and the drainage medium in circumferential direction of the filter medium are positioned adjacent to each other over 15-85 of the circumference of the filter medium.

18. A filter comprising the set comprising the filter candle according to claim 1, accommodated in a housing, wherein the housing further comprises a basin positioned under the bottom cap for collecting coalesced liquid that has drained via the drip-off position.

19. The filter according to the claim 18, wherein positioning aids are provided on a side of the bottom cap facing the drainage medium for positioning the coalescent medium and the drainage medium in respect of the bottom cap.

20. A bottom cap comprising at least one drainage opening for discharging liquid that has coalesced in a coalescence medium of a coalescence filter from a drainage medium, where a side of the bottom cap facing away from the filter medium is provided with a drip-off position that is located at a position shifted relative to the at least one drainage opening formed through the bottom side to a central part of the bottom cap and with at least one drainage profile extending from at least one drainage opening to the drip-off position, the at least one drainage profile being provided for discharging the coalesced disperse phase from the at least one drainage opening to the drip-off position along which the coalesced disperse phase is discharged, wherein the at least one drainage profile protrudes from or is recessed into a bottom surface of the bottom cap facing away from the filter medium, as part of the filter according to claim 18.

* * * * *